US009704286B2

United States Patent
Fortin (10) Patent No.: US 9,704,286 B2
(45) Date of Patent: Jul. 11, 2017

(54) INFORMATION PROCESSING APPARATUS, METHOD, AND STORAGE MEDIUM FOR GENERATING A VIEWPOINT INDEPENDENT MAP

(71) Applicant: SQUARE ENIX HOLDINGS CO., LTD., Tokyo (JP)

(72) Inventor: Jean-François F Fortin, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 183 days.

(21) Appl. No.: 14/368,695

(22) PCT Filed: Jan. 29, 2014

(86) PCT No.: PCT/JP2014/052593
§ 371 (c)(1),
(2) Date: Jun. 25, 2014

(87) PCT Pub. No.: WO2014/123128
PCT Pub. Date: Aug. 14, 2014

(65) Prior Publication Data
US 2015/0097825 A1   Apr. 9, 2015

Related U.S. Application Data (60) Provisional application No. 61/761,338, filed on Feb. 6, 2013.

(51) Int. Cl.
*G06T 15/04* (2011.01)
*G06T 15/20* (2011.01)
(Continued)

(52) U.S. Cl.
CPC ............ *G06T 15/20* (2013.01); *A63F 13/525* (2014.09); *G06T 15/04* (2013.01); *A63F 13/52* (2014.09);
(Continued)

(58) Field of Classification Search
None
See application file for complete search history.

(56) References Cited

U.S. PATENT DOCUMENTS 5,742,749 A * 4/1998 Foran ...................... G06T 15/50
345/426
8,698,813 B2    4/2014 Iwasaki
(Continued)

FOREIGN PATENT DOCUMENTS

JP    2009-295162    12/2009
JP    2012-245347    12/2012

OTHER PUBLICATIONS

Lance Williams, "Casting curved shadows on curved surfaces", In Proceedings of the 5th annual conference on Computer graphics and interactive techniques (SIGGRAPH '78), 1978, ACM, New York, NY, USA, pp. 270-274 (1978).
(Continued)

*Primary Examiner* — Barry Drennan
*Assistant Examiner* — Jason Pringle-Parker
(74) *Attorney, Agent, or Firm* — Greenblum & Bernstein, P.L.C.

(57) ABSTRACT

An information processing apparatus acquires viewpoint information indicating a viewpoint for which rendering of a 3D scene is performed and generates, by a predetermined calculation, a viewpoint independent map for an object included in a rendering scope based on the acquired viewpoint information. And then the apparatus stores each pixel of the generated viewpoint independent map in association with a distance between an object corresponding to the pixel and the viewpoint indicated by the acquired viewpoint information. The apparatus does not perform the predetermined calculation in a case where a pixel of the viewpoint independent map for the object included in the rendering
(Continued)

scope corresponding to the distance from the viewpoint indicated by the acquired viewpoint information is already stored.

27 Claims, 4 Drawing Sheets

(51) Int. Cl.
  *A63F 13/525* (2014.01)
  *A63F 13/52* (2014.01)
(52) U.S. Cl.
  CPC ...... *G06T 2210/36* (2013.01); *G06T 2215/12* (2013.01)

(56) References Cited

U.S. PATENT DOCUMENTS

| | | | |
|---|---|---|---|
| 8,698,828 B2 | 4/2014 | Plowman et al. | |
| 2004/0233195 A1* | 11/2004 | Bunnell | G06T 15/60 345/426 |
| 2005/0248572 A1* | 11/2005 | Lengyel | G06T 15/04 345/428 |
| 2007/0182753 A1* | 8/2007 | Isidoro | G06T 15/04 345/587 |
| 2008/0025615 A1* | 1/2008 | Min | G06T 3/4007 382/201 |
| 2010/0026682 A1* | 2/2010 | Plowman | G06T 15/40 345/419 |
| 2010/0060630 A1 | 3/2010 | Nystad et al. | |
| 2012/0208636 A1* | 8/2012 | Feige | A63F 13/12 463/31 |
| 2012/0299938 A1 | 11/2012 | Iwasaki | |

OTHER PUBLICATIONS

Anirudh.S. Shastry, "Soft-edge shadows", In GameDev.net. 2005. Retrieved from: http://www.gamedev.net/page/resources/_technical/graphics-programming-and-theory/soft-edge-shadows-r2193 (Jan. 18, 2005).

Randima Fernando et al., "Adaptive Shadow Maps", In Proceedings of the 28th annual conference on Computer graphics and interactive techniques (SIGGRAPH '01), 2001, ACM, New York, NY, USA, pp. 387-390 (2001).

International Search Report (ISR) in International Patent Application No. PCT/JP2014/052593, dated Mar. 25, 2014.

"Research report on next-generation fundamental technologies of digital content", Digital Content Association of Japan, pp. 69-70 (Mar. 2007).

Extended European Search Report (EESR) from European Patent Office (EPO) in European Patent Appl. No. 14749236.7, dated Oct. 14, 2016.

Guanbo Bao et al., "Large-scale forest rendering: Real-time, realistic, and progressive", Computers and Graphics, Elsevier, GB, vol. 36, No. 3, XP028470678, ISSN: 0097-8493, DOI: 10.1016/J.CAG. 2012.01.005 [retrieved on Feb. 1, 2012], pp. 140-151 (Jan. 11, 2012).

Daniel Scherzer et al., "A Survey of Real-Time Hard Shadow Mapping Methods", Computer Graphics Forum, vol. 30, No. 1, XP055206201, ISSN: 0167-7055, DOI: 10.1111/j.1467-8659.2010. 01841.x, pp. 169-186 (Mar. 17, 2011).

Nan Liu et al., "Shadow Mapping Algorithms: A Complete Survey", Computer Network and Multimedia Technology, 2009. CNMT 2009. International Symposium on, IEEE, Piscataway, NJ, USA, XP031596604, ISBN: 978-1-4244-5272-9, pp. 1-5 (Jan. 18, 2009).

* cited by examiner

INFORMATION PROCESSING APPARATUS, METHOD, AND STORAGE MEDIUM FOR GENERATING A VIEWPOINT INDEPENDENT MAP

CLAIM FOR PRIORITY

This application is a U.S. National Stage of PCT/JP2014/052593 filed on Jan. 29, 2014, and claims the priority benefit of U.S. provisional application 61/761,338, filed Feb. 6, 2013, the contents of which is expressly incorporated by reference herein in its entirety.

TECHNICAL FIELD

The present invention relates to an information processing apparatus, a method of controlling the same, a program, and a storage medium, and in particular to a technique for sharing a map generated by calculation usable independently of a viewpoint position

BACKGROUND ART

In recent years, accompanying a development in techniques for information communication using networks such as the Internet, service provision to customers via networks is being carried out in a variety of fields. In one such service, screens rendered on a server are provided to client devices via the network as in so called cloud-based gaming. In such a service, it is possible to update a display of a screen on a client device by the server acquiring information of an operation performed on the client device, for example, and rendering a screen changed in accordance with the operation, and providing the screen to the client device. In other words, in cloud-based gaming, the user can play a game and have the same experience as on a device having a sufficient rendering capabilities even if he or she does not have a client device comprising sufficient rendering capabilities.

Note, amongst games provided via a network, there exist network games of a multiple simultaneous participant type such as MMORPGs (Massively Multiplayer Online Role-Playing Game), and network games in which a plurality of users alternatively use the same field in a game. In these kinds of network games, the fields that an operation character that the user operates can be moved to are the same, but game screens, that are different based on changes in the progress caused by the operation of the user and the movement path, are provided to the client devices. In other words, game screens rendered based on viewpoint parameters change in accordance with operations of the user (position and direction) are generated for each client device, and these are not necessarily matching.

In the rendering of a 3D scene, various maps (or textures) are used, and those that are fixed results that are independent of viewpoint parameters (viewpoint independent maps) are included amongst these maps. For example, maps such as light maps, and shadow maps used for providing an effect based on a light source indicate the same results independent of viewpoint parameters. Specifically, a portion of the reflections and the shading that occur due to a light source for a single point of a rendering object arranged in a field always produce a fixed result from any direction viewed, as long as the object and the light source are static. In other words, for rendering of a 3D scene, if a light map or a shadow map is generated and stored beforehand, it can be considered that usage upon rendering is possible as long as there is no influence due to dynamic elements.

On the other hand, in cases where this kind of viewpoint independent map is used, the following kinds of problems can arise in application to rendering objects for which the distance to the viewpoint is close. For example, in cases where shading for a single light source applied to a rendering object of the 3D scene is rendered using a shadow map, whether or not the shading appears in the pixels of the screen to be generated depends on whether or not another object exists between the rendering object rendered for the pixel and the light source (cf. Depth buffer shadow mapping method). The pixels of the shadow map indicate the distance up until the first point that a light bundle that passes through the pixel in a projection from the light source hits on the rendering object. Accordingly, if the distance between the pixel and the light source obtained in a case where the pixels of the screen are transformed for a projection of the light source is larger than a distance shown by a corresponding shadow map pixel, shading appears, and if it is the same or smaller, shading does not appear. A floor surface and rendering objects that exist near a viewpoint for screen rendering in a scene occupy a relatively large region in the screen, but due to the resolution of the shadow map, one pixel of the map is used repeatedly for shading determinations of a plurality of pixels of that region. In other words, in cases where the resolution of the shadow map and the number of pixels of the rendering object rendered for the viewpoint do not correspond, because the shadow map is stretched and used for the shading determination, the possibility exists that aliasing will arise in the shading that appears, and an unnatural impression will be given.

As a method of improving this kind of problem of aliasing occurring in shading, a method in which the shadow map is generated at a high-resolution from the start so that the shading can be rendered at an ideal sharpness independent of the resolution of the rendering object in the screen can be considered. However, because a shadow map with a high-resolution requires a large data capacity, and furthermore usually multiple light sources arranged in a scene exist, memory regions may be pressed just by maintaining the shadow maps. Also, as explained above, in a system that provides screens generated on the server side, because it can be considered that screens for the same 3D scene will be provided in parallel to a plurality of client devices, generating a viewpoint independent map for each client device is not realistic. Also, because for rendering objects arranged in positions in the scene where the viewpoint cannot get close to, the number of pixels that occupy the screen when rendered is always small, a viewpoint independent map having a high resolution may be unnecessary. Also, because a predetermined calculation is necessary for the generation of the viewpoint independent map, the more pixels in the map, the more it may cause problems from the perspective of calculation amount.

SUMMARY OF INVENTION

The present invention was conceived in view of these kinds of problems in the conventional techniques. The present invention provides an information processing apparatus, a method of controlling the same, a program and a storage medium for efficiently generating and sharing a viewpoint independent map.

The present invention in its first aspect provides an information processing apparatus comprising: acquisition means for acquiring viewpoint information indicating a viewpoint for which rendering of a 3D scene is performed; generation means for generating, by a predetermined calculation, a viewpoint independent map for an object included in a rendering scope based on the acquired viewpoint information; and storage means for storing each pixel of the generated viewpoint independent map in association with a distance between an object corresponding to the pixel and the viewpoint indicated by the acquired viewpoint information, wherein the generation means does not perform the predetermined calculation in a case where a pixel of the viewpoint independent map for the object included in the rendering scope corresponding to the distance from the viewpoint indicated by the acquired viewpoint information is already stored.

The present invention in its second aspect provides a method of controlling an information processing apparatus, comprising: an acquisition step of acquiring viewpoint information indicating a viewpoint for which rendering of a 3D scene is performed; a generation step of generating, by a predetermined calculation, a viewpoint independent map for an object included in a rendering scope based on the acquired viewpoint information; and a storage step of storing each pixel of the generated viewpoint independent map in association with a distance between an object corresponding to the pixel and the viewpoint indicated by the acquired viewpoint information, wherein in the generation step, the predetermined calculation is not performed in a case where a pixel of the viewpoint independent map for the object included in the rendering scope corresponding to the distance from the viewpoint indicated by the acquired viewpoint information is already stored.

Further features of the present invention will become apparent from the following description of exemplary embodiments (with reference to the attached drawings).

DESCRIPTION OF EMBODIMENTS

Below, detailed explanation for explanatory embodiments of the present invention will be given with reference to the drawings. Note that in the embodiment explained below, explanation will be given of an example in which the present invention is adopted to a server capable of rendering, in parallel, screens provided to a plurality of client devices, as examples of information processing apparatuses. However, the present invention can be adopted to other devices capable of rendering, in parallel, screens provided to a device.

<Configuration of the Screen Provision System>

Figure 1:
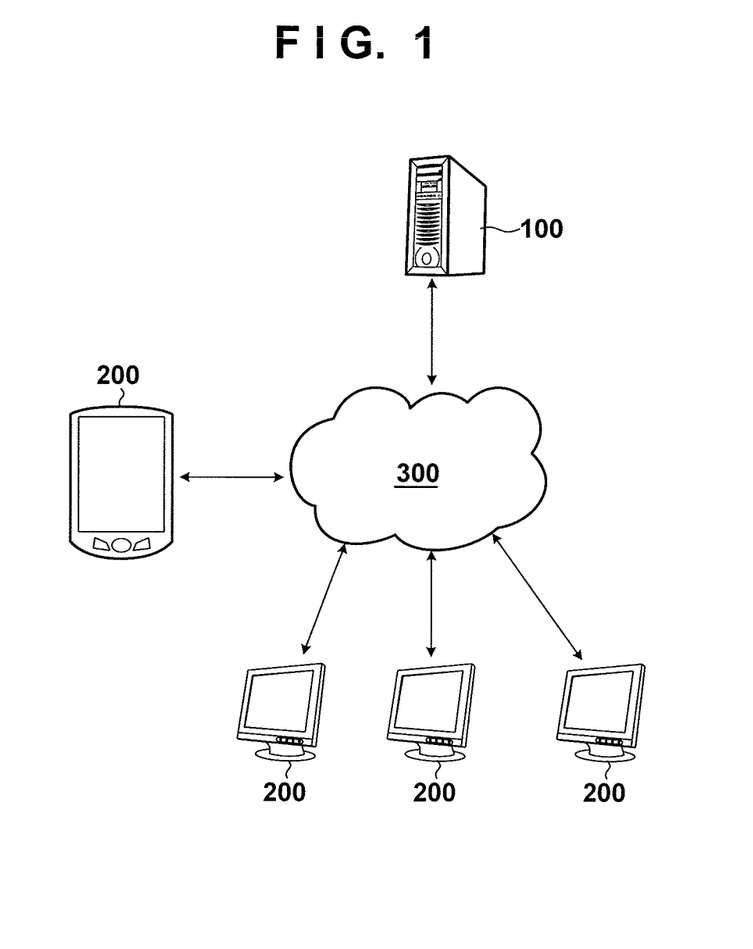
FIG. 1 is a view for showing a system configuration of a screen provision system according to embodiments of the present invention.

FIG. 1 is a view for showing a system configuration of a screen provision system comprised of the above described server and client devices according to embodiments of the present invention. The system realizes cloud-based gaming.

A server 100 renders screens (game screens) for a game for which a cloud-based gaming service provision is performed, and outputs this as coded moving image data in a streaming format to client devices 200. Note, in this embodiment, explanation is given having the server 100 have a rendering function, but working of the present invention is not limited to this. For example, an embodiment in which an external rendering server specialized for rendering processing performs screen rendering in accordance with commands output from the server 100, and outputting the generated game screens may be configured. Also, in this embodiment, for simplicity, client devices 200, which connect to the server 100, will be explained as being able to use a single game content item by sharing, but working of the present invention is not limited to this.

The client devices 200 connect to the server 100 via a network 300 in order to receive the service provision. The client devices 200 may be mobile terminals such as mobile telephones, smart phones, or portable game devices and are not limited to PCs or stationary game devices. Also, the network 300 is not limited to a public communication network such as the Internet, and may be a LAN, or may be an embodiment in which the server 100 and the client devices 200 are connected directly by wire/wirelessly and communicating. The client devices 200 comprise an operation input interface, and transmit to the server 100 information indicating operation input performed by the user, or transmit to the server 100 after having applied predetermined processing to information indicating the operation input.

The server 100 acquires information for the operation input from the client devices 200 via the network 300, and generates game screens by performing predetermined calculation and rendering processing for the frame to be rendered. The server 100 encodes the screens into moving image data, for example, and transmits to the corresponding client device 200. The client device 200 performs predetermined processing such as decoding when it receives the moving image data, and displays by outputting video signal to a display apparatus that the client device 200 comprises, or to a display apparatus connected to the client device 200. By doing this, the provision of game screens to the users of the client devices 200 is realized in the screen provision system.

Note, in this embodiment, explanation is given having a plurality of client devices 200 connect to the server 100 in parallel, and receive the provision of the game screens, but the working of the present invention is not limited to this, and the server 100 may be something that connects to the client devices 200 one-to-one.

<Functional Configuration of the Server 100>

Figure 2:
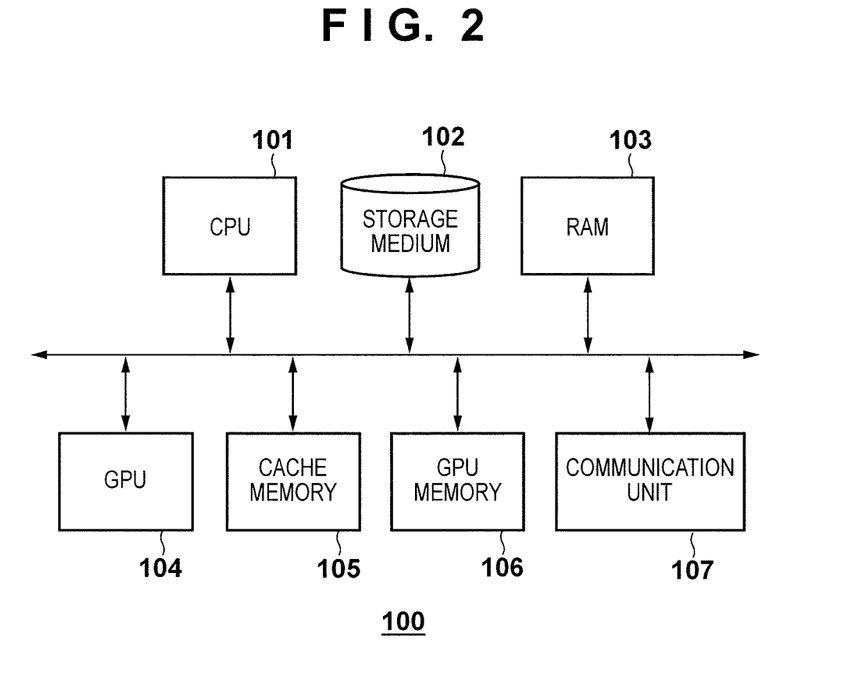
FIG. 2 is a block diagram for showing a functional configuration of a server 100 according to embodiments of the present invention.

FIG. 2 is a block diagram for showing a functional configuration of the server 100 according to embodiments of the present invention.

A CPU 101 controls the operation of each block that the server 100 comprises. Specifically, the CPU 101 controls the operation of the blocks by reading out a game program recorded on a storage medium 102, loading it into a RAM 103, and executing it.

The storage medium 102 may be a non-volatile memory such as an HDD, a rewritable ROM, or the like. In the storage medium 102, not only game programs for game content provided to the client devices 200, but also various parameters necessary in game programs are recorded. In the storage medium 102, data of rendering objects necessary in the generation of game screens, and the like, are recorded. Amongst the data of the rendering objects, not only model data and texture data, for example, but also rendering programs such as shaders that are used, and calculation data used by the rendering programs (constants such as light source intensity, light source vectors, and variables such as the light source attributes) may be included.

The RAM 103 is a volatile memory. The RAM 103, is not only used as a loading area of game programs, but is also used as a storage area for storing intermediate data output in operation of the blocks.

A GPU 104 performs rendering processing of game screens having received instruction from the CPU 101. Specifically, the GPU 104, in a case where a rendering instruction is performed that uses an API prepared beforehand upon execution of a game program, for example, receives a rendering command corresponding to the instruction via a driver. In this embodiment, the GPU 104 receives a rendering command, and loads into a cache memory 105, which is a loading area for temporarily loading and retaining data necessary for the rendering. The GPU 104, in accordance with the rendering command, performs rendering of a game screen in a GPU memory 106 using data loaded into the cache memory 105.

Also, in this embodiment, for simplicity, explanation is given having a single cache memory 105 be shared for the game programs performed for each of the plurality of client devices 200, but the cache memory 105 may be configured to be divided into a plurality of regions.

A communication unit 107 is a communication interface that the server 100 comprises. The communication unit 107 can perform data transmission and receiving with the client devices 200 via the network 300. Specifically, the communication unit 107 receives information of operation input performed on the client device 200, or performs transmission to a client device 200 corresponding to a game screen rendered by the GPU memory 106 (as video data into which the game screen is encoded, in this embodiment). Data transmission and receiving encompasses a conversion into a data format for a predetermined communication mode, and a conversion into a format processable on the server 100 from such a format.

<Overview of Viewpoint Independent Map Generation>

Firstly, explanation will be given, with reference to the drawings, of an overview for the generation of a viewpoint independent map used for rendering of a game screen on the server 100 of this embodiment having this kind of configuration.

<Data Configuration of the Viewpoint Independent Map>

As explained above, in the generation of the game screens for a 3D scene, viewpoint independent maps defined only based on a relationship of static objects (including a light source) arranged in the 3D scene, independent of the arranged viewpoint, exist. In viewpoint independent maps are included, for example, shadow maps, the light maps, and the like.

Figure 3:
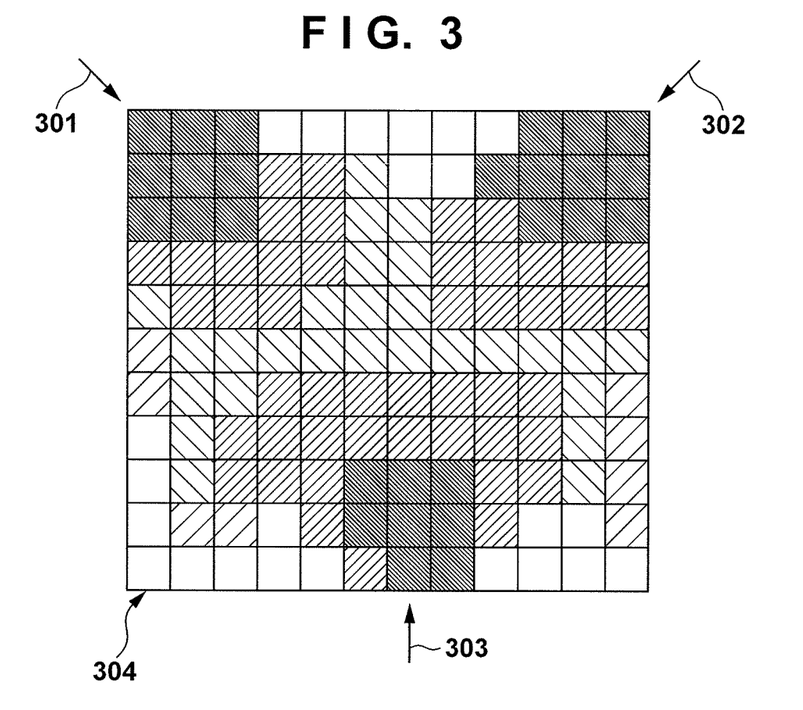
FIG. 3 is a view for simply showing a resolution of a viewpoint independent map to be generated according to embodiments of the present invention.

It is possible to generate a viewpoint independent map beforehand for a 3D scene in a state in which dynamic rendering objects do not exist, but a data amount increases depending on the width of a field of the 3D scene that is envisioned, and the storage area for storing may be pressed. Because screens are provided based on viewpoints normally differing for each of the client devices in a cloud gaming system capable of generating game screens to be provided to a plurality of client devices simultaneously, the viewpoint independent maps strictly necessary in the generation of each of the screens are different. In other words, there is no necessity to prepare viewpoint independent maps for all of the fields of the envisioned 3D scene, and the generation of each screen can be performed so long as there are the minimum necessary viewpoint independent maps in the provision of the game screens for the client devices. Also, because they are viewpoint-independent, it is possible to reference the viewpoint independent maps generated for each client device in the generation of a game screen corresponding to another client device. For example, in the example of a shadow map, it is possible to reference a shadow map generated for a single light source when generating a game screen for a viewpoint including, in the rendering scope, a rendering object for which it is necessary to determine an influence due to the light source (a shading determination). Accordingly, it is possible to use a viewpoint independent map generated in the rendering of any game screen upon rendering of game screens for a plurality of viewpoints 301-303 set for the same field 304 as shown in FIG. 3, for example.

Meanwhile, as explained above, considering the image quality of the game screens, it is advantageous that a resolution at which the viewpoint independent map should be generated be determined. Even for the same rendering object, the number of pixels occupied within the screen changes based on the distance from the viewpoint and the direction for which the game screen is generated. For example, in order to generate a high image quality game screen that cancels problems such as aliasing being noticeable, when shading rendering is performed with reference to a shadow map, or the like, a shading determination being performed for each pixel of a rendering object rendered in the game screen is advantageous. Alternatively, it is advantageous that the number of shading determinations performed on a region is equivalent to the number of pixels on a region that the object occupies, or a number greater than that number.

Accordingly, in the server 100 of this embodiment, in order that the image quality of a game screen, for which a calculation result for a calculation performed using a viewpoint independent map is applied, be ideal, the generation of a viewpoint independent map is performed adapting to the number of pixels in the screen of the rendering object for which the calculation result is applied. In other words, in the server 100 of this embodiment, basically, a viewpoint independent map is generated adaptively in accordance with the number of pixels of an object rendered in a generated screen, and stored in a cache memory 105, or the like, for example. In this way, by storing a generated viewpoint independent map in the cache memory 105, it can be referenced in a shading determination when generating a game screen for another viewpoint.

Figure 4:
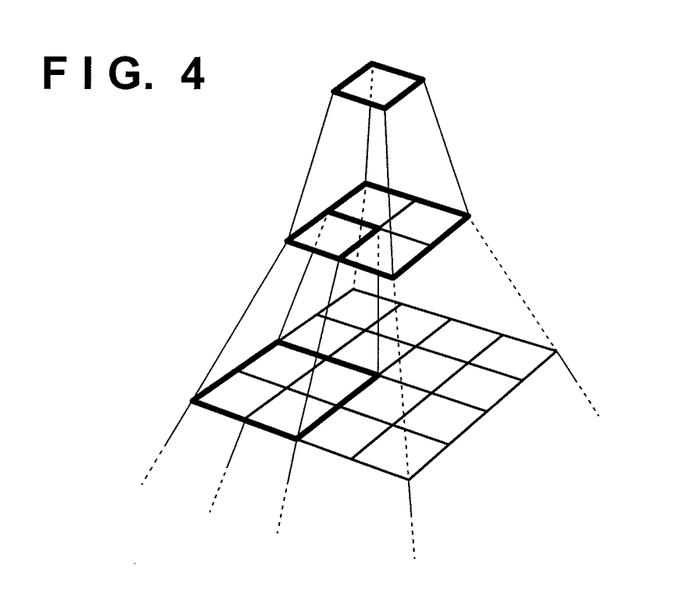
FIG. 4 is a view for showing a data configuration of a viewpoint independent map according to embodiments of the present invention.

Also, because for the viewpoint independent map, the resolution is made different in accordance with the distance between the rendering object, for which the shading determination is performed, and the viewpoint, and the server 100 of this embodiment generates viewpoint independent maps in a mipmap format. Specifically, the server 100 generates a viewpoint independent map in a hierarchical structure, as in FIG. 4, configured so that between one layer (upper layer) and a layer directly below that layer (lower layer), one pixel of the upper layer corresponds to four pixels of the lower layer. In other words, compared to the map of the upper layer, the map of the lower layer is configured so as to have a resolution that is double in a horizontal orientation and in a vertical orientation. By configuring the viewpoint independent map in this way, it is possible to maintain a plurality of shadow maps having different resolutions to be used for the same rendering object, for example. Accordingly, in the generation of a game screen, the shading determination can be performed with reference to a map having a corresponding resolution out of the viewpoint independent maps. In this embodiment, explanation is given having the viewpoint independent maps maintained in a configuration in which layers are divided out for each specific resolution by taking a mipmap format, and the map of the corresponding resolution is referenced in the game screens to be generated. However, it should be easily understood that the layered configuration and the stride of the resolution to be generated are not limited to this.

For example, in the example of FIG. 3, the resolution of the viewpoint independent map to be generated is shown in the hatching shading, and in the regions close to the viewpoints 301-303, the resolution is larger (the hatching is thicker) and as the viewpoint is moved away from, the resolution becomes lower (the hatching is thinner). Note, in FIG. 3, explanation is given for an example where the field 304 is divided into a grid shape, and the resolution is divided in order to simply show the resolutions requested for the viewpoint independent map, but the working of the present invention is not limited to this. In other words, because information of an angle of a pitch direction is included in the viewpoint, strictly speaking, rather than dividing the field 304 into a grid shaped region as in FIG. 3, the resolution may be determined adaptively based on the distance to the rendering object defined based on the viewpoint and the line of sight direction (viewpoint information).

Also, in this embodiment, explanation is given having the resolution of the viewpoint independent map to be generated be made different based on the distance from the viewpoint, and because the rendering object and the viewpoint are not necessarily directly facing, the resolution may be changed in accordance with the angle formed by the line of sight direction and the surface normal of the rendering object. In other words, because the larger the absolute value of the angle formed between the line of sight direction and the surface normal of the rendering object, the more the number of pixels that occupy the surface in the game screen to be generated decreases, even when the resolution of the viewpoint independent map is low, setting the shading rendered for the surface to an ideal image quality is possible. Accordingly, the resolution of the viewpoint independent map to be generated may be determined depending not only on the distance to the viewpoint, but also on an arrangement relationship between the rendering object and the viewpoint.

<Generation Processing of the Viewpoint Independent Map>

Figure 5:
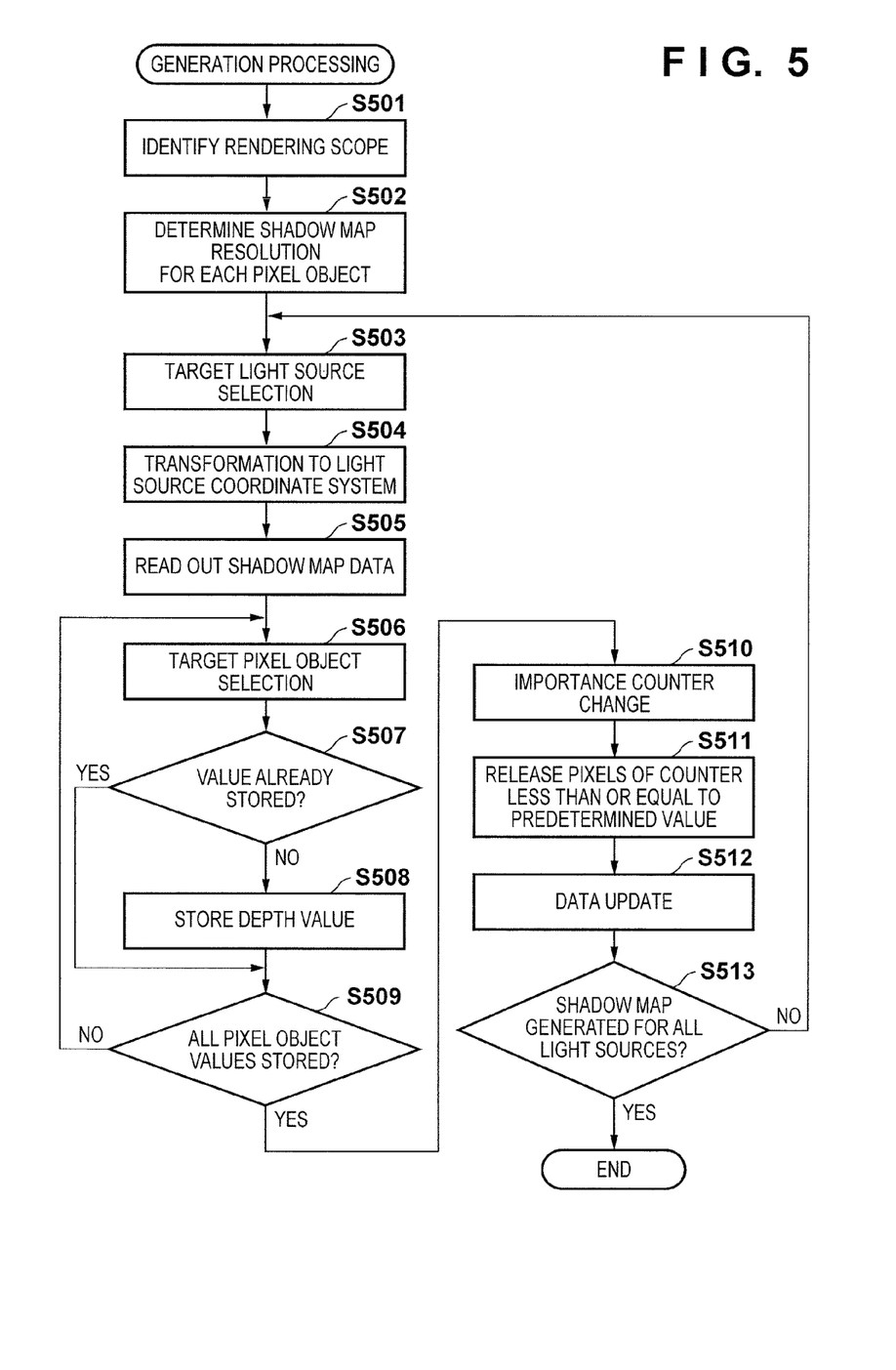
FIG. 5 is a flowchart showing an example of viewpoint independent map generation processing executed on the server 100 according to embodiments of the present invention.

Next, explanation will be given, using the flowchart of FIG. 5, for the generation processing of a viewpoint independent map in the server 100 of this embodiment for generating, and storing in the cache memory 105, a shadow map which is a viewpoint independent map having this kind of a data configuration. The processing corresponding to the flowchart can be realized by the CPU 101 reading out a corresponding processing program stored in the storage medium 102, for example, loading it into the RAM 103, and executing it. The generation processing will be explained as something that is executed, in the rendering processing of the game screen for one frame, after information of the viewpoint (viewpoint information) for a game screen is determined, that is provided to the client device 200, for example.

In the explanation below, for simplicity, explanation is given having the CPU 101 perform the generation processing of the shadow map of the above described data configuration, but it goes without saying that the processing for generation of a mipmap, and calculation may be performed by the GPU 104, for example, which excels at parallel processing. Also, in this embodiment, because the server 100 can perform the generation of the screens provided to the plurality of clients, this generation processing may be executed in the rendering processing of each screen executed in parallel.

In step S501, the CPU 101 identifies the scope (rendering scope) in which the game screen to be generated in the rendering processing is to be rendered, based on determined viewpoint information. The rendering scope indicates a scope determined by a clipping plane which indicates a closest distance and a farthest distance from out of a four-sided pyramid defined by the viewpoint position and the line of sight direction, for example.

In step S502, the CPU 101 identifies an object rendered (a pixel object) at a frontmost surface in the pixels of the game screen to be rendered out of the rendering objects included in the rendering scope, and acquires information of the distance from the viewpoint to the pixel object. Specifically, the CPU 101, in a case where, for example, rendering processing executed in parallel performs Deferred Rendering, acquires a depth value of each pixel of the game screen to be rendered as information of the distance up to each pixel object from the viewpoint by referencing a Depth map in a G-buffer previously generated. The CPU 101, based on obtained information of the distance from the viewpoint to each pixel object, determines the resolution of the shadow map to be generated for each pixel, and stores to the RAM 103, for example. The resolution of the shadow map to be generated is a resolution associated with a distance range that classifies the distance between the viewpoint and the pixel object, for example, i.e. the layers of the mipmap are determined beforehand in a table, and the CPU 101, with reference to this table, may identify the resolution corresponding to the distance of the pixel object.

In step S503, the CPU 101 selects, out of the light sources for which it is necessary to consider the influence for the identified rendering scope, a single light source (a target light source) for which a shadow map is not generated for the current frame.

In step S504, the CPU 101 transforms the coordinates of the pixel object corresponding to the pixels of the game screen to be generated into the coordinate system of the target light source. Specifically, firstly, the CPU 101 identifies the world coordinates of each pixel object based on the viewpoint information and the depth value of each pixel object. Then, the CPU 101 generates a transformation matrix based on a ray direction and the coordinates of the target light source, and transforms into the coordinates of the light source coordinate system by applying the obtained matrix to the world coordinates. The coordinates of the light source coordinate system may be of a two-dimensional coordinate system for a predetermined plane having a ray direction of the target light source as a normal direction considering the shadow map to be generated. In other words, in the generation of the shadow map, because information of the depth from the light source of each pixel object is unnecessary, it may be excluded.

In step S505, the CPU 101 reads out data of a shadow map that is already generated for the target light source from the cache memory 105. Alternatively, in cases where the data of the shadow map generated for the target light source does not exist in the cache memory 105, empty shadow map data is generated for data storage. The empty shadow map data to be generated is made to be data having an initialization value such as 0 or null for the data of each layer, and which is data having a smaller data capacity than cases in which information of all of the layers is embedded.

In step S506, the CPU 101 selects one pixel object (target pixel object) for which a determination as to whether or not a value corresponding to the shadow map is already stored for the current frame has not been performed.

In step S507, the CPU 101 determines whether or not a value of the shadow map to be generated for the target pixel object, i.e. information of the depth value for the depth from the light source is stored in the data of the shadow map for the target light source. Specifically, the CPU 101 determines whether or not information of a depth value other than an initialization value is stored at a two-dimensional coordinate position in the light source coordinate system of the object in the map of the layer corresponding to the resolution determined for the target pixel object of the data of the shadow map. In this embodiment, in order to simplify the explanation, explanation is given having an attribute of the light source be parallel light, but it should be easily understood that the method of generation of the shadow map will differ depending on an attribute of the light source. The CPU 101, in cases where it determines that the value of the shadow map to be generated is stored, for each pixel object, moves the processing to step S509, and in cases where it determines that the value is not stored, it moves the processing to step S508.

In step S508, the CPU 101 defines a light path corresponding to a pixel of the shadow map to be generated for the target pixel object, and acquires the depth value up until the first fragment to appear in light path. In other words, the CPU 101 calculates the distance from the light source up until the first rendering object that a light bundle that passes along the light path encounters. Then, the CPU 101 stores the obtained depth value for the pixel of the shadow map to be generated.

In this embodiment, explanation is given having sampling of depth values be performed in cases where a value to be generated is not stored in the data of the shadow map, but in cases where a mipmap data configuration is taken, the value to be generated may be calculated from a value of another pixel without performing sampling. In other words, because, in a mipmap, one pixel of an upper layer is an average value of corresponding four pixels of a lower layer (the layer directly below the upper layer), if values are stored for three pixels of a lower layer corresponding to one pixel of an upper layer, for example, the remaining pixel of the lower layer is calculable without performing sampling. Similarly, if, for example, values are stored for the 2×2 pixels of the lower layer, the one pixel of the upper layer corresponding to the four pixels is calculable as the average value. Also, in a case where, in three consecutive layers (an upper layer, a middle layer, and a lower layer), one pixel of the upper layer and the two pixels out of the four pixels of the middle layer corresponding to that pixel have values, if the four pixels of the lower layer corresponding to remaining single pixel of the middle layer, which do not have a value, have values stored, the value of the remaining another pixel of the middle layer is similarly calculable.

In step S509, the CPU 101 determines whether or not a value corresponding to data of a shadow map for the target light source is stored, for all of the pixel objects. The CPU 101, in a case where it determines that a value corresponding to data of the shadow map is stored for all of the pixel objects, moves the processing to step S510, and returns the processing to step S506 in cases where it determines that they are not all stored.

In step S510, the CPU 101 increases, by a predetermined value, the value of a counter indicating an importance for a pixel of a shadow map of the target light source used in the rendering processing of the current frame. Meanwhile, the CPU 101 decreases, by a predetermined value, a value of a counter of a pixel not used in the rendering processing of the current frame, out of the pixels of a shadow map of the target light source. Then, the CPU 101, in step S511, releases by updating values of pixels for which the value of the counter.

In step S512, the CPU 101 stores, in the cache memory 105, data of the shadow map for the target light source for which a value used in the rendering processing of the current frame is stored. Here, in cases where data of the shadow map for the target light source is already stored in the cache memory 105, the CPU 101 updates with the data generated in the processing of step S506 through step S511.

In the server 100 of this embodiment, in order to reduce the data capacity of the data of the shadow map, for pixels used in the rendering processing, they are retained by causing their importance to increase. Also, for the pixels that are not used, their importance is reduced steadily, and by determining them to be unnecessary in cases where their importance falls below a predetermined standard, i.e. by determining that usage frequency is low and releasing their data, it can be made so that the data of a shadow map comprising only data that can be used are retained. By doing this, it is possible to maintain values of a shadow map that can be referenced in the rendering processing of game screens provided for consecutive frames to a single client device, and values of a shadow map that can be referenced in the rendering processing of game screens provided around the same time to a plurality of client devices. In other words, the pixels for which usage frequency is high in any rendering processing executed in parallel on the server 100 as a whole are retained, and by releasing the pixels for which the usage frequency is low, the storage area that the data of the shadow map occupies in the cache memory 105 can be reduced.

In step S513, the CPU 101 determines whether or not a shadow map is generated for the current frame for all of the light sources for which it is necessary to consider an influence for an identified rendering scope. The CPU 101, in a case where it determines that a shadow map is generated for all of the light sources, completes this generation processing, and in a case where it determines that there is a light source for which a shadow map is not generated, it returns the processing to step S503.

By doing this, in the server 100 of this embodiment, a viewpoint independent map having an appropriate resolution distribution to match an arrangement of the viewpoint and the rendering objects can be generated so that the representation according to the viewpoint independent map in the game screens to be generated is of an ideal image quality. Also, by configuring so that, for the pixels with a low usage frequency out of the pixels of the viewpoint independent map, data is deleted, the data capacity of the viewpoint independent map stored in the storage area can be reduced.

Note, when a shadow map generated by this generation processing is used in the rendering processing, similarly to in step S507, the value of an appropriate pixel of the shadow map may be referenced from the cache memory 105 in accordance with the resolution determined based on the distance between the viewpoint and the pixel object corresponding to the pixels of the game screen to be generated, and it may be used for a shading determination.

As explained above, the information processing apparatus of this embodiment can generate and share a viewpoint independent map efficiently. Specifically, an information processing apparatus acquires viewpoint information indicating a viewpoint for which rendering of a 3D scene is performed and generates, by a predetermined calculation, a viewpoint independent map for an object included in a rendering scope based on the acquired viewpoint information. And then the apparatus stores each pixel of the generated viewpoint independent map in association with a distance between an object corresponding to the pixel and the viewpoint indicated by the acquired viewpoint information. The apparatus does not perform the predetermined calculation in a case where a pixel of the viewpoint independent map for the object included in the rendering scope corresponding to the distance from the viewpoint indicated by the acquired viewpoint information is already stored.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the controlling method according to the present invention are realizable by a program executing the methods on a computer. The program is providable/distributable by being stored on a computer-readable storage medium or through an electronic communication line.

This application claims the benefit of U.S. Provisional Patent Application No. 61/761,338, filed Feb. 6, 2013, which is hereby incorporated by reference herein in its entirety.

The invention claimed is:

1. An information processing apparatus, comprising:
   at least one processor; and
   a memory including executable instructions that, when executed by the processor, cause the processor to perform operations including:
   acquiring viewpoint information indicating a viewpoint for which rendering of a 3D scene is performed;
   determining that a pixel of a viewpoint independent map for a target object included in a rendering scope, corresponding to a distance from the viewpoint indicated by the acquired viewpoint information, is not stored in the memory;
   generating, by a predetermined calculation and in response to the determining, the viewpoint independent map for the target object included in the rendering scope based on the acquired viewpoint information;
   storing, in the memory, each pixel of the generated viewpoint independent map in association with the distance between a pixel object corresponding to the pixel and the viewpoint indicated by the acquired viewpoint information; and
   performing rendering processing of a screen corresponding to the viewpoint using the generated viewpoint independent map,
   wherein the processor does not perform the predetermined calculation in a case where the pixel of the viewpoint independent map for the target object included in the rendering scope, corresponding to the distance from the viewpoint indicated by the acquired viewpoint information, is already stored in the memory.

2. The information processing apparatus according to claim 1, wherein the memory stores, in a case where the pixel of the viewpoint independent map for the target object included in the rendering scope, corresponding to the distance from the viewpoint indicated by the acquired viewpoint information, is not stored in the memory, a corresponding pixel of the generated viewpoint independent map.

3. The information processing apparatus according to claim 1, wherein
   the viewpoint independent map is comprised of a plurality of maps, each associated with a different distance, and
   the memory stores, for a map corresponding to the distance between the pixel object corresponding to the pixel in the plurality of maps and the viewpoint indicated by the acquired viewpoint information, each pixel of the generated viewpoint independent map.

4. The information processing apparatus according to claim 3, wherein the plurality of maps includes maps that each has a different resolution.

5. The information processing apparatus according to claim 3, wherein the plurality of maps includes maps having a higher resolution with respect to a same object as an associated distance is shorter.

6. The information processing apparatus according to claim 3, wherein, from the plurality of maps, a pixel value of a pixel of a first map with which a first distance is associated, corresponds to an average value of pixel values of pixels of corresponding positions of a second map with which a second distance, which is shorter than the first distance, is associated.

7. The information processing apparatus according claim 3, the operations further including:
   newly generating a target pixel of a first map, with which a first distance is associated, from the plurality of maps, based on at least one of:
   a pixel of a position corresponding to the target pixel of a second map with which a second distance, which is shorter than the first distance, is associated; or
   a pixel of a position corresponding to a peripheral pixel of the target pixel of the first map, and to the target pixel of a third map with which a third distance, which is longer than the first distance, is associated, wherein
   the memory stores the target pixel newly generated by the processor, in association with the first distance.

8. The information processing apparatus according to claim 7, wherein, in the newly generating, the processor generates, in a case where all of the pixels of locations corresponding to the target pixel of the second map are stored by the memory, the target pixel making the pixel value be an average value of all of the pixels.

9. The information processing apparatus according to claim 7, wherein, in the newly generating, the processor generates, in a case where a pixel of a position corresponding to the target pixel of the third map, and peripheral pixels other than the target pixel corresponding to the pixel of the first map are stored by the memory, the target pixel making the pixel value be a value obtained by subtracting an average value of the peripheral pixels from a pixel value of the pixel of the corresponding position of the third map.

10. The information processing apparatus according to claim 1, further comprising:
    a communication interface which is able to perform communication with an external apparatus;
    a central processor which is able to determine the viewpoint for which to perform rendering of the 3D scene for the external apparatus, with which communication is performed; and
    a graphics processor which is able to perform rendering of the screen corresponding to the viewpoint using the generated viewpoint independent map, wherein the processor acquires the viewpoint information indicating the determined viewpoint, and the communication interface transmits the rendered screen to the external apparatus, with which communication is performed.

11. The information processing apparatus according to claim 10, wherein the communication interface communicates with a plurality of external devices, the memory stores each pixel of the generated viewpoint independent map for different external devices as a single data item, and the processor does not perform the predetermined calculation in the case where the pixel of the viewpoint independent map, corresponding to the distance from the viewpoint indicated by the acquired viewpoint information, is generated and stored previously for one of the plurality of external devices.

12. The information processing apparatus according to claim 1, wherein the viewpoint independent map includes a shadow map or a light map based on an object and a static light source arranged in the 3D scene.

13. The information processing apparatus according to claim 1, wherein the memory, in a case where a pixel, from the pixels of the viewpoint independent map, is not used for rendering satisfies a predetermined condition, deletes the pixel.

14. A method of controlling an information processing apparatus, the method comprising:

acquiring viewpoint information indicating a viewpoint for which rendering of a 3D scene is performed;

determining that a pixel of a viewpoint independent map for a target object included in a rendering scope, corresponding to a distance from the viewpoint indicated by the acquired viewpoint information, is not stored in a memory;

generating, by a predetermined calculation and in response to the determining, the viewpoint independent map for the target object included in the rendering scope based on the acquired viewpoint information;

storing, in a memory, each pixel of the generated viewpoint independent map in association with the distance between a pixel object corresponding to the pixel and the viewpoint indicated by the acquired viewpoint information;

performing rendering processing of a screen corresponding to the viewpoint using the generated viewpoint independent map, wherein the predetermined calculation is not performed in a case where the pixel of the viewpoint independent map for the target object included in the rendering scope, corresponding to the distance from the viewpoint indicated by the acquired viewpoint information, is already stored in the memory.

15. The method of controlling the information processing apparatus according to claim 14, wherein, in the storing, in a case where the pixel of the viewpoint independent map for the target object included in the rendering scope, corresponding to the distance from the viewpoint indicated by the acquired viewpoint information, is not stored in the memory, a corresponding pixel of the generated viewpoint independent map is stored in the memory.

16. The method of controlling the information processing apparatus according to claim 14, wherein the viewpoint independent map is comprised of a plurality of maps, each associated with a different distance, and in the storing, for a map corresponding to the distance between the pixel object corresponding to the pixel in the plurality of maps and the viewpoint indicated by the acquired viewpoint information, each pixel of the generated viewpoint independent map is stored in the memory.

17. The method of controlling the information processing apparatus according to claim 16, wherein the plurality of maps includes maps that each has a different resolution.

18. The method of controlling the information processing apparatus according to claim 16, wherein the plurality of maps includes maps having a higher resolution with respect to a same object as an associated distance is shorter.

19. The method of controlling the information processing apparatus according to claim 16, wherein, from the plurality of maps, a pixel value of a pixel of a first map with which a first distance is associated, corresponds to an average value of pixel values of pixels of corresponding positions of a second map with which a second distance, which is shorter than the first distance, is associated.

20. The method of controlling the information processing apparatus according to claim 16, further comprising:

newly generating a target pixel of a first map, with which a first distance is associated, from the plurality of maps, based on at least one of:

a pixel of a position corresponding to the target pixel of a second map with which a second distance, which is shorter than the first distance, is associated; or a pixel of a position corresponding to a peripheral pixel of the target pixel of the first map, and to the target pixel of a third map with which a third distance, which is longer than the first distance, is associated, wherein in the storing, the target pixel generated in the newly generating, is stored in the memory in association with the first distance.

21. The method of controlling the information processing apparatus according to claim 20, wherein, in the newly generating, in a case where all of the pixels of locations corresponding to the target pixel of the second map are stored in the storing, the target pixel is generated making the pixel value be an average value of all of the pixels.

22. The method of controlling the information processing apparatus according to claim 20, wherein, in the newly generating, in a case where a pixel of a position corresponding to the target pixel of the third map, and peripheral pixels other than the target pixel corresponding to the pixel of the first map are stored in the storing, the target pixel is generated making the pixel value be a value obtained by subtracting an average value of the peripheral pixels from a pixel value of the pixel of the corresponding position of the third map.

23. The method of controlling the information processing apparatus according to claim 14, further comprising:

performing communication with an external apparatus;

determining the viewpoint for which to perform the rendering of the 3D scene for the external apparatus, with which communication is performed; and performing rendering of the screen corresponding to the viewpoint using the generated viewpoint independent map, wherein in the acquiring, the viewpoint information indicating the determined viewpoint is acquired, and in the communicating, the rendered screen is transmitted to the external apparatus, with which communication is performed.

24. The method of controlling the information processing apparatus according to claim 23, wherein in the communicating, communication is performed with a plurality of external devices, in the storing, each pixel of the generated viewpoint independent map is stored in the memory as a single data item for different external devices, and in the generating, the predetermined calculation is not performed in the case where the pixel of the viewpoint independent map, corresponding to the distance from the viewpoint indicated by the acquired viewpoint information, is generated and stored previously for one of the plurality of external devices.

25. The method of controlling the information processing apparatus according to claim 14, wherein the viewpoint independent map includes a shadow map or a light map based on an object and a static light source arranged in the 3D scene.

26. The method of controlling the information processing apparatus according to claim 14, wherein in the storing, in a case where a pixel, from the pixels of a viewpoint independent map, that is not used for rendering satisfies a predetermined condition, the pixel is deleted.

27. A non-transitory computer-readable storage medium for storing a program for causing a computer to execute each step of the method of controlling the information processing apparatus according to claim 14.

* * * * *